United States Patent
Largey et al.

(10) Patent No.: US 7,177,772 B2
(45) Date of Patent: Feb. 13, 2007

(54) SYSTEM AND METHOD FOR GENERATING AND MEASURING NOISE PARAMETERS

(75) Inventors: Henry P. Largey, Wylie, TX (US);
Dale A. Heaton, Lucas, TX (US);
Lianrui Zang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 28 days.

(21) Appl. No.: 10/853,467

(22) Filed: May 25, 2004

(65) Prior Publication Data

US 2005/0267716 A1    Dec. 1, 2005

(51) Int. Cl.
*G01R 25/00* (2006.01)
(52) U.S. Cl. ............... 702/65; 702/17; 702/57; 702/66; 702/67; 702/69; 702/70; 702/111; 324/613
(58) Field of Classification Search ............... 702/65, 702/66, 67, 70, 17, 57, 69, 111; 324/613; 455/114.2, 115.1, 115.2, 67.13; 375/224
See application file for complete search history.

(56) References Cited

U.S. PATENT DOCUMENTS

| | | | | |
|---|---|---|---|---|
| 4,742,561 A | * | 5/1988 | Tipton | 455/67.12 |
| 4,972,511 A | * | 11/1990 | Singer et al. | 455/226.1 |
| 5,371,481 A | * | 12/1994 | Tiittanen et al. | 332/103 |
| 5,719,579 A | * | 2/1998 | Torre et al. | 342/13 |
| 6,657,510 B2 | * | 12/2003 | Haghighat | 332/103 |

* cited by examiner

*Primary Examiner*—Marc S. Hoff
*Assistant Examiner*—Phuong Huynh
(74) *Attorney, Agent, or Firm*—Wade James Brady, III; Fredrick J. Telecky, Jr.

(57) ABSTRACT

A method for measuring noise parameters includes generating a noise signal at a noise source. The noise signal includes a first input signal at a first frequency and a second input signal at a second frequency. The first input signal and the second input signal are modulated onto a carrier to generate a modulated signal. The modulated signal is attenuated to a desired power level and applied to a device under test to obtain a noise measurement.

20 Claims, 1 Drawing Sheet

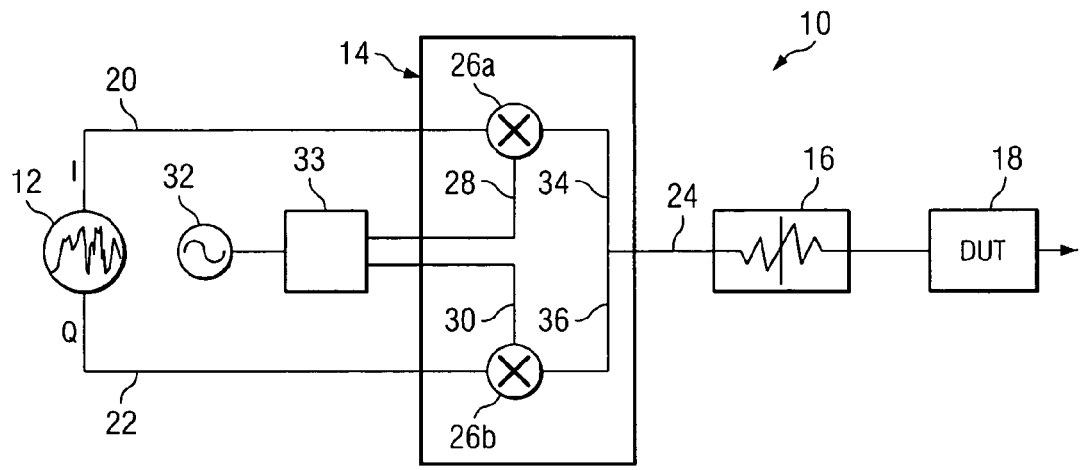
FIG. 1
| 204 ↘ PROGRAMMED ATTENUATION (dB) | 20 | 30 | 40 | 50 | 60 | 70 | 80 | 103 |
|---|---|---|---|---|---|---|---|---|
| NOISE POWER (dBm) | −44.76 | −54.31 | −64.40 | −74.27 | −84.31 | −91.97 | −95.19 | −99.58 |
| STANDARD DEVIATION (dBm) | 0.761 | 0.739 | 0.726 | 0.710 | 0.712 | 0.707 | 0.648 | 0.698 |
FIG. 2
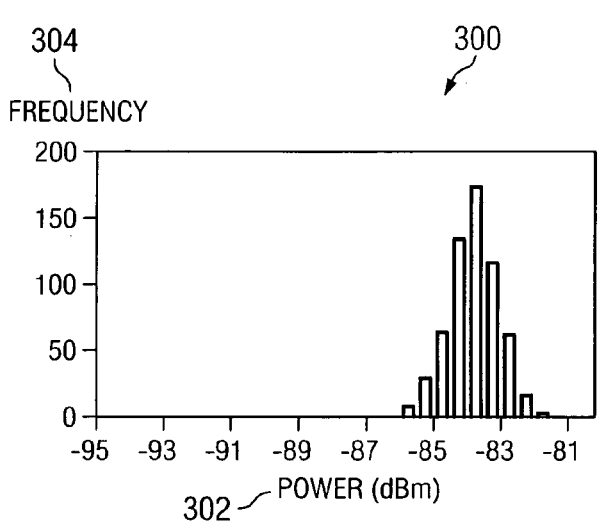
FIG. 3
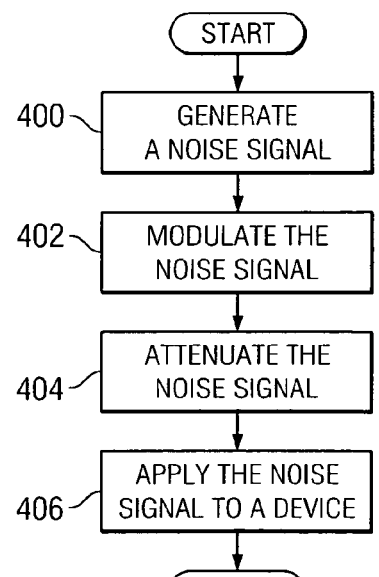
FIG. 4

SYSTEM AND METHOD FOR GENERATING AND MEASURING NOISE PARAMETERS

TECHNICAL FIELD OF THE INVENTION

This invention relates in general to the testing of electronic components, and more particularly to the generation and measurement of noise parameters in an electronic component.

BACKGROUND OF THE INVENTION

Testing equipment may be used to accurately generate and measure the noise parameters of a device under test (DUT). The noise parameters of a component are usually specified in terms of a noise factor F. The noise factor of a device is defined as the ratio of the signal-to-noise ratio available from the DUT output to the signal-to-noise ratio of the DUT input, at a standard reference temperature of 290 degrees Kelvin. Noise factor is often expressed in dB, which is sometimes referred to as a noise figure. Noise figure testing equipment typically includes a noise source that is cycled on and off to provide two power levels. The noise source results in a noise signal that must be matched to the DUT as closely as possible. Typical noise sources, however, have high voltage standing wave ratios, which lead to inaccuracy in the resulting noise figures. Additionally, different excess noise ratios may be required for the testing of different devices. Accordingly, many different noise sources may be required to test different devices.

SUMMARY OF THE INVENTION

From the foregoing it may be appreciated by those skilled in the art that a need has arisen for a system for accurately measuring the noise parameters. In accordance with the present invention, a system and method for measuring noise parameters is provided that substantially eliminates or greatly reduces disadvantages and problems associated with conventional testing equipment.

In one embodiment, a method for measuring noise parameters includes generating a noise signal at a noise source. The noise signal includes a first input signal at a first frequency and a second input signal at a second frequency. The first input signal and the second input signal are modulated onto a carrier to generate a modulated signal. The modulated signal is attenuated to a desired power level and applied to a device under test to obtain a noise measurement.

Depending on the specific features implemented, particular embodiments of the present invention may exhibit some, none, or all of the following technical advantages. Various embodiments may be capable of generating white Gaussian noise for testing electronic components. Specifically, an arbitrary wave generator may be used to generate white noise that may be modulated. Some embodiments may be capable of generating a white noise signal of a lower voltage standing wave ratio. Accordingly, the accuracy of the resulting noise figure measurement may be improved. Other embodiments may be capable of generating noise signals of different excess noise ratios. Thus, a single noise source may be used to test a variety of different devices.

Other embodiments may be capable of attenuating the noise signal to compensate for signal path loss or device noise to achieve a more accurate noise figure measurement. Additionally, some embodiments may eliminate the need for switches and other hardware in the noise testing equipment. Thus, the noise testing equipment may be less complex and more reliable.

Other technical advantages will be readily apparent to one skilled in the art from the following figures, descriptions and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 is a block diagram of a noise testing system;

FIG. 2 is a table summarizing modulated noise source outputs at different attenuations;

FIG. 3 is a graph illustrating an example power spectrum distribution for a modulated noise source; and FIG. 4 is a flow chart of a method for determining the noise factor of a device under test.

DETAILED DESCRIPTION OF EXAMPLE EMBODIMENTS

FIG. 1 is a block diagram of a noise testing system 10 that may be used to test RF/microwave devices in accordance with one embodiment of the present invention. Noise testing system 10 includes a noise source 12, a modulator 14, and an attenuator 16. Noise testing system 10 may be used to generate white Gaussian noise for the noise parameter testing of a DUT 18. The accuracy of noise testing equipment is particularly important for DUTs 18 that are intended to operate at RF/microwave frequencies. Such DUTs 18 may include the components of wireless devices in the cellular telephone industry, which are typically designed to operate in a frequency range on the order of approximately 10 MHz to 6 GHz. Thus, in particular embodiments, DUT 18 may include a global systems for mobile (GSM) transceiver, a global positioning system (GPS), a Bluetooth receiver, or other cellular component. Because the noise signal generated by noise testing system 10 is modulated and attenuated to a desired power level, the accuracy of noise testing results may be improved. Additionally, because the modulated noise signal may be attenuated to varying power levels, a single noise source may be used to test a variety of different devices.

Noise source 12 generates a first input signal 20 of a first frequency and a second input signal 22 of a second frequency. In particular embodiments, noise source 12 may include a digital memory such as a RAM (random access memory). For example, noise source 12 may include an Arbitrary Wave Generator (AWG) that generates a pattern of noise to be applied to DUT 18. The pattern of noise that comprises first input signal 20 and second input signal 22 may include white Gaussian noise of a desired distribution.

In various embodiments, first input signal 20 and second input signal 22 may be in quadrature. Accordingly, first input signal 20 may include an in phase signal, and second input signal 22 may include a quadrature signal that is ninety degrees from first input signal 20. For example, where "A" is the frequency of the respective signals, first input signal 20 may be represented by $\cos(A)$, and second input signal 22 may be represented by $\sin(A)$. The frequency range of first and second input signals 20 and 22 may be called baseband and are on the order of approximately 10 Hz to 2 Mhz. For example, a GSM transceiver operates on a frequency range on the order of 1 Khz to 200 Khz.

The flatness of first and second input signals 20 and 22 may be limited by the sampling frequency range, fs, of noise source 12. Additionally, the size of the memory of noise source 12 may determine the quantization error or minimum frequency resolution of first and second input signals 20 and 22. White Gaussian noise of a fine resolution may result in more random noise with less of a quantization effect. Additionally, minor corrections may be applied to the first and second input signals 20 and 22 to correct for wide bandwidth noise spectra flatness. For example, a parabolic least squares curve fit may be used to achieve a desire standard of deviation.

First and second input signals 20 and 22 may be modulated by modulator 14 before transmission to DUT 18. In operation, modulator 14 combines first input 20 and second input 22 by applying first and second inputs 20 and 22 onto a carrier. The result of combining signals 20 and 22 with a carrier is a modulated signal 24. In particular embodiments, modulator 14 comprises a quadrature modulator that operates to modulate the amplitude and frequency of first and second input signals 20 and 22 at substantially the same time.

Modulator 14 includes at least two mixers 26. Specifically, a first mixer 26a and a second mixer 26b may receive first input signal 20 and second input signal 22, respectively, from noise source 12. First and second mixers 26a also receive first and second carrier signals 28 and 30, respectively. First and second carrier signals 28 and 30 are generated by a carrier source 32. The phase of the generated first and second carrier signals 28 and 30 may be shifted at phase shifter 33 such that, like first and second input signals 20 and 22, first and second carrier signals 28 and 30 are separated by ninety degrees. For example, where "B" represents 2·π·F and "F" is the carrier frequency of carrier source 32 as measured in radians, first carrier signal 28 may be represented by sin(B), and second carrier signal 30 may be represented by cos(B). In particular embodiments, carrier source 32 may include an RF/microwave source generator, which operates to generate first and second carrier signals 28 and 30 on the order of 900 Mhz to 2000 Mhz.

Mixer 26a, which receives first carrier signal 28, combines first input signal 20 and first carrier signal 28 to create a first mixed signal 34. For example, where first input signal 20 is equal to cos(A) and first carrier signal is equal to cos(B), first mixed signal 34 may be equal to cos(A)·cos(B), or [cos(A+B)+cos(A−B)]/2. Similarly, mixer 26b receives second carrier signal 30 and combines second carrier signal 30 with second input signal 22 to create a second mixed signal 36. For example, where second input signal 22 is equal to sin(A) and second carrier signal 30 is equal to sin(B), second mixed signal 36 may be equal to sin(A)·sin(B), or [cos(A−B)+cos(A+B)]/2. Modulator 14 then combines first and second mixed signals 34 and 36 and generates modulated signal 24. In the example described above, modulated signal 24 is equal to cos(A)·cos(B)+sin(A)·sin(B), or cos(A−B). In particular embodiments, modulated signal 24 has a power level on the order of −82 to −86 dBm. The power level of modulated signal 24 may be adjusted to achieve the best carrier rejection. As a result, the accuracy of the noise figure associated with DUT 18 may be improved.

Noise source system 10 also includes attenuator 16. Attenuator 16 comprises a programmable attenuator that may be adjusted to a desired power level. Attenuator 16 operates to attenuate modulated signal 24 to a desired power level before modulated signal 24 is applied to DUT 18 to obtain noise parameters. In particular embodiments, attenuator 16 may be programmed to attenuate modulated signal 24 to a desired attenuation level to match the requirements for the DUT 18. For example, attenuator 16 may be programmed to a power level on the order of 1 db to 113 db. As will be described in more detail with regard to FIGS. 2 and 3, a power meter may also be used in conjunction with attenuator 16 to calibrate modulated signal 24 to a desired power level.

In various embodiments, attenuator 16 is also programmable to achieve a desired Excess Noise Ratio (ENR) for modulated signal 24. ENRs are typically specified as a function of frequency and are based on the bandwidth of noise source 12. Because noise source 12 of system 10 is selected based on the type of DUT 18, however, the required ENR also varies as a function of the type of DUT 18. For example, a DUT 18 comprising a GSM transceiver may need an ENR on the order of 6 to 11. As another example, a DUT 18 comprising a Bluetooth receiver may have a desired ENR on the order of 11 to 20. Because attenuator 16 may be adjusted to produce variable ENRs, a noise figure measurement may be calculated that matches noise source 12. Accordingly, a single noise source 12 may be used to generate a variety of different input test signals appropriate for a variety of DUTs 18.

As discussed above, conventional noise figure testing equipment typically includes a noise source that is cycled on and off to provide two power levels. When the noise source is on, the input power level of the noise source is on the order of −88.94 dBm and renders a standard deviation of 0.707 dBm. When the noise source is off, the input power level of the noise source is on the order of −99.5238 dBm and renders a standard deviation of 0.6913 dBm. Noise testing system 10, however, may be used to generate a modulated signal 24, which may be attenuated for the particular DUT 18. FIG. 2 is a table 200 summarizing modulated noise source outputs 202 at different programmed attenuations 204 in accordance with one embodiment of the present invention. A standard noise source or a calibrated spectrum analyzer in accordance with the National Institute of Standards and Technology (NIST) may be used to establish the input power level for noise source 12 and the desired attenuation/gain for attenuator 16.

In various embodiments, attenuator 16 may be programmed to attenuate modulated signal 24 from 20 dBm to 103 dBm. Accordingly, the noise power input 202 may be varied from −44.76 to −99.58 dBm, and the standard deviation 206 may vary from 0.698 to 0.761 dBm. For example, noise source 12 may be used at a noise power 202, of −64.40 dBm where attenuator 16 is programmed at an attenuation 204 of 40 dBm. Alternatively, and as another example, noise source 12 may be used at a noise power level 202 of −91.97 dBm where attenuator 16 is programmed at an attenuation 204 of 70 dBm. Because noise testing system 10 generates noise signals 202 of different excess noise ratios, a single noise source 12 may be used to test a variety of different devices. Additionally, modulate test signal 24 may be attenuated at the appropriate level to compensate for signal path loss or device noise to achieve a more accurate noise figure measurement.

As summarized in FIG. 2, at high ENR settings, such as 103 dBm, the input power level 202 is linear with the attenuation/gain 204. Where ENR is near the noise floor, however, a polynomial curve fit or an empirical relation may be obtained for a one time characterization of the relationship between the input power level 202 and the attenuation/gain 204. The characterization may then be used for noise figure testing, bit error rate testing, or other noise related testing and simulations.

FIG. 3 is a graph 300 illustrating an example power spectrum distribution for a modulated noise source in accordance with one embodiment of the present invention. As discussed above, first and second input signals 20 and 22 may comprise White Gaussian noise of a desired standard of deviation. A standard noise source which is cycled on and off to generate two power signals generally results in a power distribution that varies from approximately −87 dBm to −91 dBm. Noise source 12, however, which may comprise an arbitrary wave generator may result in a power distribution 302 that varies from −82 dBm to −86 dBm, as illustrated. The frequency 304 for such power levels is a Guassian distribution that varies from approximately 0 to 200 KHz. Accordingly, noise testing system 10 may be capable of generating a white noise signal of a lower voltage standing wave ratio than that of a system using a cycled noise source. The noise input signals 20 and 22 may then be modulated onto a carrier source 32 and attenuated at an attenuator 16 for a desired ENR. As a result, the accuracy of the resulting noise figure, bit error rate, or other noise testing results may be improved.

FIG. 4 is a flow chart of a method for determining the noise factor of a DUT 18. At step 400, a noise signal is generated at a noise source 12. The noise signal comprises a first input signal 20 of a first frequency and a second input signal 22 of a second frequency. The noise source 12 may be further used to control a bandwidth associated with the first and second signals 20 and 22. In particular embodiments, noise source 12 may include an arbitrary wave generator that may be used to generate a noise signal with a Gaussian distribution. The noise signal may have a voltage standing wave ratio on the order of 1.01 to 1.002 or better.

At step 402, the noise signal is modulated. In particular embodiments, a quadrature modulator 14 may be used to modulate first and second input signal onto a carrier 32. Carrier 32 may comprise a RF/microwave carrier that generates carrier signals 28 and 30. Input signals 20 and 22 may be combined with carrier signals 28 and 30 to result in modulated signal 24. In particular embodiments, modulating first and second input signals 20 and 22 may include simultaneously modulating the amplitude and frequency of the noise signal to generate modulated signal 24.

At step 404, the noise signal is attenuated to a desired power level. The desired power level of modulated signal 24 may match the noise power input for the DUT 18. Additionally, the desired power level may be calibrated with a power meter to obtain a desired ENR for modulated signal 24. The ENR may be selected based upon the type of DUT 18 and noise source 12 from which modulated noise signal 24 is generated. In particular embodiments, modulated signal 24 may be attenuated to a power level on the order of 1 to 113 db. After the noise signal is modulated and attenuated, the noise signal may be applied to DUT 18 at step 406 for noise figure testing, bit error rate testing, or other noise related testing and simulations.

In summary, a system and method for measuring noise parameters is provided. The system and method include a noise source that operates to generate white Gaussian noise for testing electronic components. Specifically, an arbitrary wave generator may be used to generate white noise that may me modulated. Because the white noise signal may be of a lower voltage standing wave ratio, the accuracy of a resulting noise figure may be improved. Additionally, noise signals of different excess noise ratios may be generated such that a variety of different devices may be tested. A programmable attenuator compensates for signal path loss or device noise and also results in a more accurate noise figure measurement.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for measuring noise parameters, comprising:
   generating a noise signal at a noise source, the noise signal comprising a first input signal at a first frequency and a second input signal at a second frequency;
   modulating the first input signal and the second input signal onto a carrier to generate a modulated signal; and
   attenuating the modulated signal to a desired power level; and
   applying the modulated signal to a device under test to obtain a noise measurement.

2. The method of claim 1, wherein generating a noise signal comprises using an arbitrary wave generator to generate a noise signal with a Gaussian distribution.

3. The method of claim 1, wherein the noise signal has a voltage standing wave ratio on the order of 1.01 to 1.001.

4. The method of claim 1, wherein modulating the first and second input signals comprises simultaneously modulating the amplitude and frequency of the noise signal.

5. The method of claim 1, wherein attenuating the modulated signal to a desired power level comprises matching the modulated signal with a noise power input for the device under test.

6. The method of claim 1, wherein attenuating the modulated signal comprises calculating an excess noise ratio for the modulated signal.

7. The method of claim 1, wherein the modulated signal has a power level on the order of −82 to −86 dBm.

8. The method of claim 1, wherein the device under test comprises an electronic component of a wireless telephone.

9. The method of claim 1, wherein modulating the first input signal and the second input signal onto a carrier comprises applying a ninety degree phase shift to at least one of the first input of the second input.

10. The method of claim 1, wherein the carrier comprises an RF source on the order of 800 MHz to 2 GHz.

11. A system for generating and or measuring noise parameters, comprising:
    a noise source operable to generate a noise signal comprising a first input signal at a first frequency and a second input signal at a second frequency;
    a modulator operable to combine the first input signal and the second input signal onto a carrier to generate a modulated signal; and
    an adjustable attenuator operable to attenuate the modulated signal to a desired power level, the modulated signal applied to a device under test to obtain a noise measurement.

12. The system of claim 11, wherein the noise source comprises an arbitrary wave generator, the noise signal having a Gaussian distribution.

13. The system of claim 11, wherein the noise signal has a voltage standing wave ratio on the order of 1.01 to 1.001.

14. The system of claim 11, wherein the modulator is further operable to simultaneously modulate the amplitude and frequency of the noise signal.

15. The system of claim 11, wherein the attenuator is further operable to attenuate the modulated signal to a desired power level by matching the modulated signal with a noise power input for the device under test.

16. The system of claim 11, wherein the attenuator is operable to calculate an excess noise ratio for the modulated signal.

17. The system of claim 11, wherein the modulated signal has a power level on the order of −82 to −86 dBm.

18. The system of claim 11, wherein the device under test comprises an electronic component of a wireless telephone.

19. The system of claim 11, wherein the modulator is further operable to modulate the first input signal and the second input signal onto a carrier by applying a ninety degree shift to at least one of the first and second input signals.

20. The system of claim 11, wherein the carrier comprises an RF source on the order of 800 MHz to 2 GHz.

* * * * *